(12) United States Patent
Ide et al.

(10) Patent No.: US 7,202,618 B2
(45) Date of Patent: Apr. 10, 2007

(54) INVERTER DEVICE

(75) Inventors: Akira Ide, Nagoya (JP); Kazuki Najima, Chiryu (JP); Motonobu Funato, Obu (JP); Shinya Sato, Obu (JP); Takashi Kawashima, Toyoake (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 0 days.

(21) Appl. No.: 11/293,914

(22) Filed: Dec. 5, 2005

(65) Prior Publication Data

US 2006/0119310 A1 Jun. 8, 2006

(30) Foreign Application Priority Data

Dec. 6, 2004 (JP) ............................. 2004-353403

(51) Int. Cl.
*H02P 1/18* (2006.01)
(52) U.S. Cl. ................ 318/254; 318/138; 318/439; 318/700; 318/701
(58) Field of Classification Search ................ 318/254, 318/138, 439, 700, 701
See application file for complete search history.

(56) References Cited

U.S. PATENT DOCUMENTS

| | | | | |
|---|---|---|---|---|
| 4,739,240 A | * | 4/1988 | MacMinn et al. | 318/696 |
| 5,107,195 A | * | 4/1992 | Lyons et al. | 318/701 |
| 5,955,860 A | * | 9/1999 | Taga et al. | 318/700 |
| 6,153,956 A | * | 11/2000 | Branecky | 310/68 B |
| 6,291,949 B1 | * | 9/2001 | Green | 318/254 |
| 6,608,462 B2 | * | 8/2003 | Slater et al. | 318/701 |
| 6,957,590 B2 | * | 10/2005 | Maeda et al. | 73/862.334 |
| 2003/0111975 A1 | * | 6/2003 | Slater | 318/701 |

FOREIGN PATENT DOCUMENTS

| | | |
|---|---|---|
| JP | 2001-136779 | 5/2001 |
| JP | 2002-262600 | 9/2002 |

* cited by examiner

*Primary Examiner*—Rina Duda
(74) *Attorney, Agent, or Firm*—Woodcock Washburn LLP

(57) ABSTRACT

The control device records, in advance, a current data table which specifies relationships between currents in respective phases in a three-phase motor and rotation angles of a rotor of the three-phase motor, obtains, from the current data table, a rotation angle of the rotor of the three-phase motor corresponding to a current in each phase in the three-phase motor detected by a current sensor before driving of the three-phase motor, and obtains an initial position of the rotor.

8 Claims, 10 Drawing Sheets

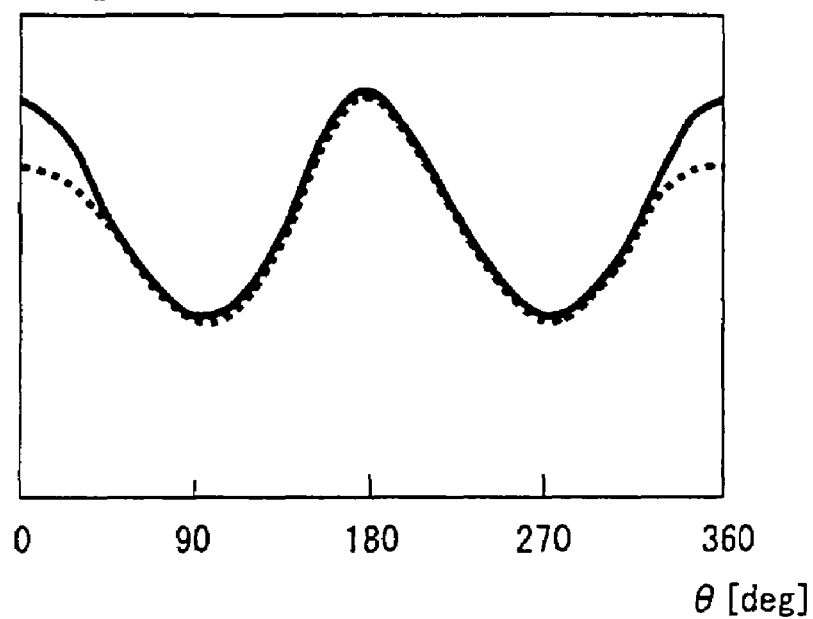
F I G. 8

INVERTER DEVICE

BACKGROUND OF THE INVENTION

1. Field of the Invention

The present invention relates to an inverter device which converts direct-current power to alternating-current power by respectively turning on and off a plurality of switching elements in order to drive a motor, and particularly to the detection of an initial position of a motor.

2. Description of the Related Art

FIG. 1 shows a conventional inverter device.

An inverter device 80 shown in FIG. 1 converts direct-current power of a direct current source 81 such as a battery into alternating-current power in order to drive a three-phase motor 82.

For example, in the inverter 80, three pairs each including two switching elements connected in series to each other are respectively connected to the direct current source 81 in parallel, and respective midpoints of the three pairs of switching elements are connected to corresponding inputs of a U phase, a V phase and a W phase of the three-phase motor 82. And, switching elements provided for respective phases in the inverter device 80 are sequentially turned on and off so that alternating-current power each having phases different by 120 degrees to each other are respectively supplied to the corresponding phases of the three-phase motor 82. Thereby, the three-phase motor 82 is driven.

Also, the respective switching elements for example are PWM (Pulse Width Modulation) controlled based on currents flowing in the respective phases of the three-phases motor 82, and the currents in the respective phases are obtained by current sensors or the like provided on the respective phases.

It is needed to detect an initial position of a rotor (a rotation angle of a rotor with respect to a given phase as a reference) upon starting the three-phase motor 82 as above in order to effectively produce torque of the three-phase motor 82. And for detecting the initial position of the rotor, methods as below are proposed for example.

(1) A method in which by applying six voltage pulses with different electrical angles by 60 degrees to respective phases of the three-phase motor 82, respective currents in the corresponding phases are obtained, based on parallel components of the obtained currents in the respective phases, a general position of a rotor of the three-phase motor 82 is obtained, further, from perpendicular components of the obtained currents in the respective phases, a correlation value for correlating the general position is obtained, and based on the general position and the correlated value, the initial position of the rotor of the three-phase motor 82 is obtained. (See Patent Document 1 for example)

(2) Some of inductances of coils constituting the three-phase motor 82 are measured in advance corresponding to positions of a rotor of the three-phase motor 82, a reference inductance is determined among the measured inductances, voltage pulses in three patterns are applied to the respective phases of the three-phase motor 82, and the initial position of the rotor of the three-phase motor 82 is obtained based on a result of comparison between the reference inductance and the inductances corresponding to the respective patterns. (See Patent Document 2 for example)

However, in both of the above methods (1) and (2), the initial position of the rotor of the three-phase motor 82 is obtained by a calculation which utilizes detected currents in the respective phases of the three-phase motor 82. When the initial position of the rotor is obtained by a calculation, noise components (for example, a current error upon current detection due to a variation of characteristics in devices constituting the inverter such as current sensors, and current noise such as a ripple current or the like generated depending on a timing of turning on switching elements) included in the detected currents in the respective phases are also included in the calculation so that there is a probability that the noise components become more considerable.

And, there is a problem that the initial position of the rotor of the three-phase motor 82 is not detected accurately when the noise components of the detected currents becomes more considerable due to the calculation.

Also, there is a problem that the above methods (1) or (2) can not be used in the case when a failure of detection of the initial position of the rotor is not tolerated.

Further, in the above methods (1) and (2), there is a problem that when calculation amount increases for obtaining a more accurate initial position, the noise components are further amplified as the calculation amount increases.

Patent Document 1

Japanese Patent Application Publication No. 2002-262600 (page 2 to page 13 and FIGS. 1 to 14)

Patent Document 2

Japanese Patent Application Publication No. 2001-136779 (page 2 to page 6 and FIGS. 1 to 6)

SUMMARY OF THE INVENTION

It is an object of the present invention to provide an inverter device which can obtain an initial position of a rotor accurately, and employs a configuration as below.

Specifically, the inverter device according to the present invention comprises a plurality of switching elements which are provided in respective phases in a motor and which convert direct-current power into alternating-current power by being tuned on and off for driving the motor, a detecting unit for detecting a current in each phase in the motor, a control unit for controlling turning on and turning off of each of the plurality of switching elements, in which the control unit records, in advance, a current data table which specifies relationships between currents in the respective phases in the motor and positions of a rotor of the motor, and obtains, from the current data table, an initial position of the rotor corresponding to a current detected by the detecting unit before driving of the motor.

As above, a position of a rotor corresponding to a detected current is obtained from a current data table specifying a relationship between a current in each phase in the motor and the position of the rotor of the motor, accordingly, the initial position of the motor can be obtained without a calculation. Thereby, the initial position of the rotor of the motor can be obtained accurately because noise components of the detected current are not amplified by the calculation.

Also, a control unit in the above inverter device can obtain, from the current data table, the initial position of the rotor based on relationships among the currents in the respective phases detected by the detecting unit.

Thereby, the initial position of the rotor can be obtained without a calculation.

Also, in the above inverter device, it is possible that the position of the rotor is a rotation angle of the rotor when one phase among the respective phases in the motor is a reference, the current data table is divided into a plurality of areas with respect to the rotation angle of the rotor in advance, and the control unit finds a current data table which corresponds to a relationship among the currents in the respective phases detected by the detecting unit, among the plurality of current data tables, and sets, as the initial position of the rotor, a value which can be obtained by substituting a current detected by the detecting unit into a linear equation with a slope corresponding to an increase or a decrease of a current specified by the found current data table.

As above, the current data table is divided into a plurality of areas, and the initial position of the rotor is obtained by substituting a detected current into a linear equation corresponding to an increase or a decrease of the current on the corresponding current data table, therefore, the initial position of the rotor can be obtained highly accurately.

Also, it is possible that in the inverter device, the linear equation is a linear equation which corresponds to a current with a largest slope among currents in the respective phases in the motor in the found current data table.

Thereby, the initial position of the rotor can be obtained by substituting a detected current into a linear equation with the largest slope, accordingly, the initial position of the rotor can be obtained in a phase of a current with a high current variation rate, and therefore, the initial position of the rotor can be highly accurate.

Also, the control unit in the above inverter device can record, in advance, an inductance data table which specifies relationships between inductances in coils constituting the motor and positions of the rotor of the motor, obtain, from the inductance data table, the position of the rotor corresponding to inductance based on a current detected by the detecting unit, and adjust the initial position of the rotor based on the obtained position of the rotor.

As above, the initial position of the rotor can be obtained by taking influence of a variation of inductance in accordance with a position of the rotor into account, accordingly, the initial position of the rotor can be obtained highly accurately further more.

Also, a control device according to the present invention is characterized in that it is provided in an inverter device including a plurality of switching elements provided in respective phases in a motor and converting direct-current power into alternating-current power by being tuned on and off for driving the motor and a detecting unit for detecting a current in each phase in the motor, controls turning on and turning off of each of the plurality of switching elements, records, in advance, a current data table which specifies relationships between currents in the respective phases in the motor and positions of a rotor of the motor, and obtains, from the current data table, an initial position of the rotor corresponding to a current detected by the detecting unit before driving of the motor.

Also, the above control device can obtain, from the current data table, the initial position of the rotor based on relationships among the currents in the respective phases detected by the detecting unit.

Also, in the above control device, it is possible that the position of the rotor is a rotation angle of the rotor when one phase among the respective phases in the motor is a reference, the current data table is divided into a plurality of areas with respect to the rotation angle of the rotor in advance, and the control device finds a current data table which corresponds to a relationship among the currents in the respective phases detected by the detecting unit, among the plurality of current data tables, and sets, as the initial position of the rotor, a value which can be obtained by substituting a current detected by the detecting unit into a linear equation with a slope corresponding to an increase or a decrease of a current specified by the found current data table.

Also, in the above control device, the linear equation can be a linear equation which corresponds to a current with a largest slope among currents in the respective phases in the motor in the found current data table.

Also, the control device can record, in advance, an inductance data table which specifies relationships between inductances in coils constituting the motor and positions of the rotor of the motor, obtain, from the inductance data table, the position of the rotor corresponding to inductance based on a current detected by the detecting unit, and adjust the initial position of the rotor based on the obtained position of the rotor.

According to the present invention, the initial position of the rotor corresponding to a detected current is obtained from the current data table specifying a relationship between a current in each phase in the motor and the position of the rotor of the motor, accordingly, the initial position of the motor can be obtained without a calculation. Thereby, because noise components of the detected current are not amplified by a calculation, the initial position of the rotor of the motor can be obtained accurately.

BRIEF DESCRIPTION OF THE DRAWINGS

FIG. 8 shows an example of an inductance data table as a graph.

DESCRIPTION OF THE PREFERRED EMBODIMENTS

Hereinafter, embodiments of the present invention will be explained by referring to drawings.

Figure 1:
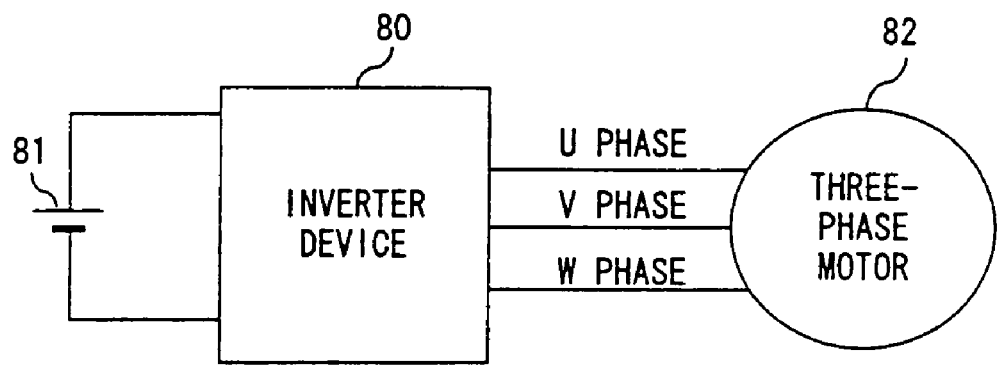
FIG. 1 shows a conventional inverter device.
Figure 2:
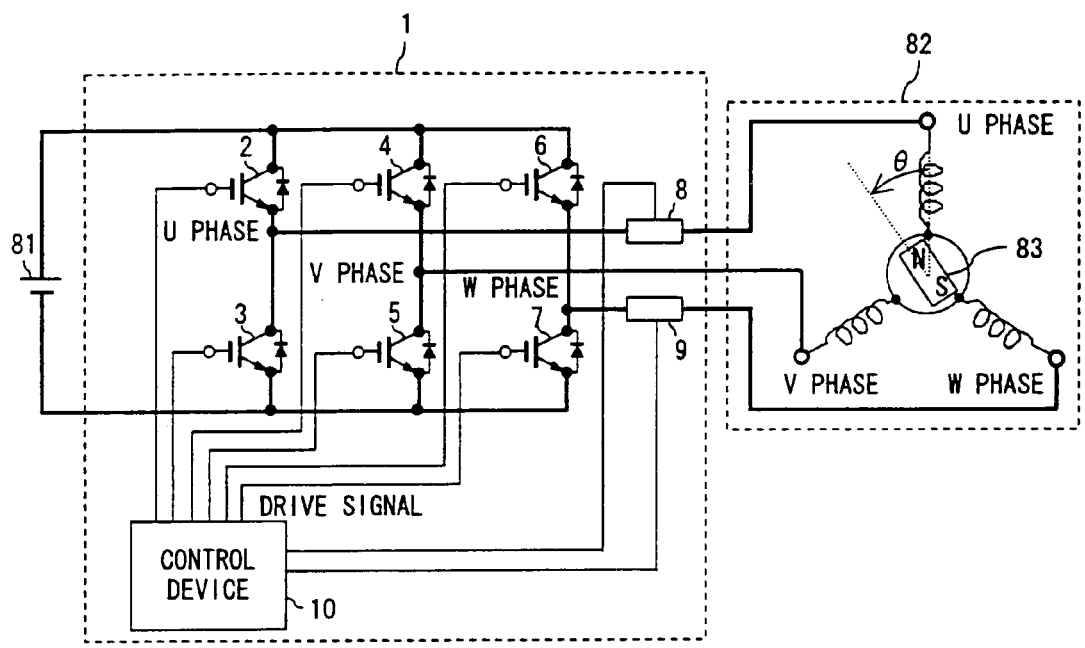
FIG. 2 shows an inverter device according to the present invention.

FIG. 2 shows an inverter device according to the present invention. It is noted that like components to those in an inverter device 80 in FIG. 1 are denoted by like numerals. Also, a three-phase motor 82 in an inverter device 1 shown in FIG. 2 is, for example, a salient-pole permanent magnet synchronous motor. Also, the three-phase motor 82 in the inverter device 1 shown in FIG. 2 is, for example, a motor for a compressor.

As shown in FIG. 2, the inverter device 1 comprises switching elements 2 to 7, current sensors 8 and 9 (detecting means) and a control device 10 (control means).

As the above switching elements 2 to 7, FETs (Field Effect Transistor),for example, can be used besides IGBTs (Insulated Gate Bipolar Transistor) as shown in FIG. 2. Also, the switching elements 2 and 3 are connected in series to each other, the switching elements 4 and 5 are connected in series to each other, and the switching elements 6 and 7 are connected in series to each other. And the above switching elements 2 to 7 are connected to a direct-current power source 81 in parallel. A midpoint of the switching elements 2 and 3 is connected to an input of a U phase of the three-phase motor 82, a midpoint of the switching elements 4 and 5 is connected to an input of a V phase of the three-phase motor 82, and a midpoint of the switching elements 6 and 7 is connected to an input of a W phase of the three-phase motor 82.

As the above current sensor 8 and 9, CTs (Current Transformer), hole elements or the like can be used. The current sensor 8 is provided for the U phase, and the current sensor 9 is provided for the W phase. Additionally, currents in the respective phases in the three-phase motor 82 can be obtained based on voltages applied to shunt resistors in the respective phases.

The above control device 10 comprises, for example, a CPU (Central Processing Unit) and the like, obtains a current in the U phase from the current sensor 8, obtains a current in the W phase from the current sensor 9, obtains a current in the V phase from total currents in the U phase and the W phase, and outputs drive signals based on the currents in the respective phases.

Then, the switching elements 2 to 7 are turned on and off respectively based on drive signals output from the control device 10, and thereby, supplies, to the respective phases in the three-phase motor 82, alternating-current power each having different phases by 120 degrees to each other so that the three-phase motor 82 is driven.

The inverter device 1 according to the present embodiment is characterized in that the control device 10 records, in advance, a "current data table" which specifies relationships between currents in the respective phases in the three-phase motor 82 and positions of the rotor 83 in the three-phase motor 82, and obtains the initial position of the rotor 83 in the three-phase motor 82 corresponding to currents in the respective phases in the three-phase motor 82 detected by the current sensors 8 and 9 before driving of the three-phase motor 82 based on the "current data table" (map).

Figure 3:
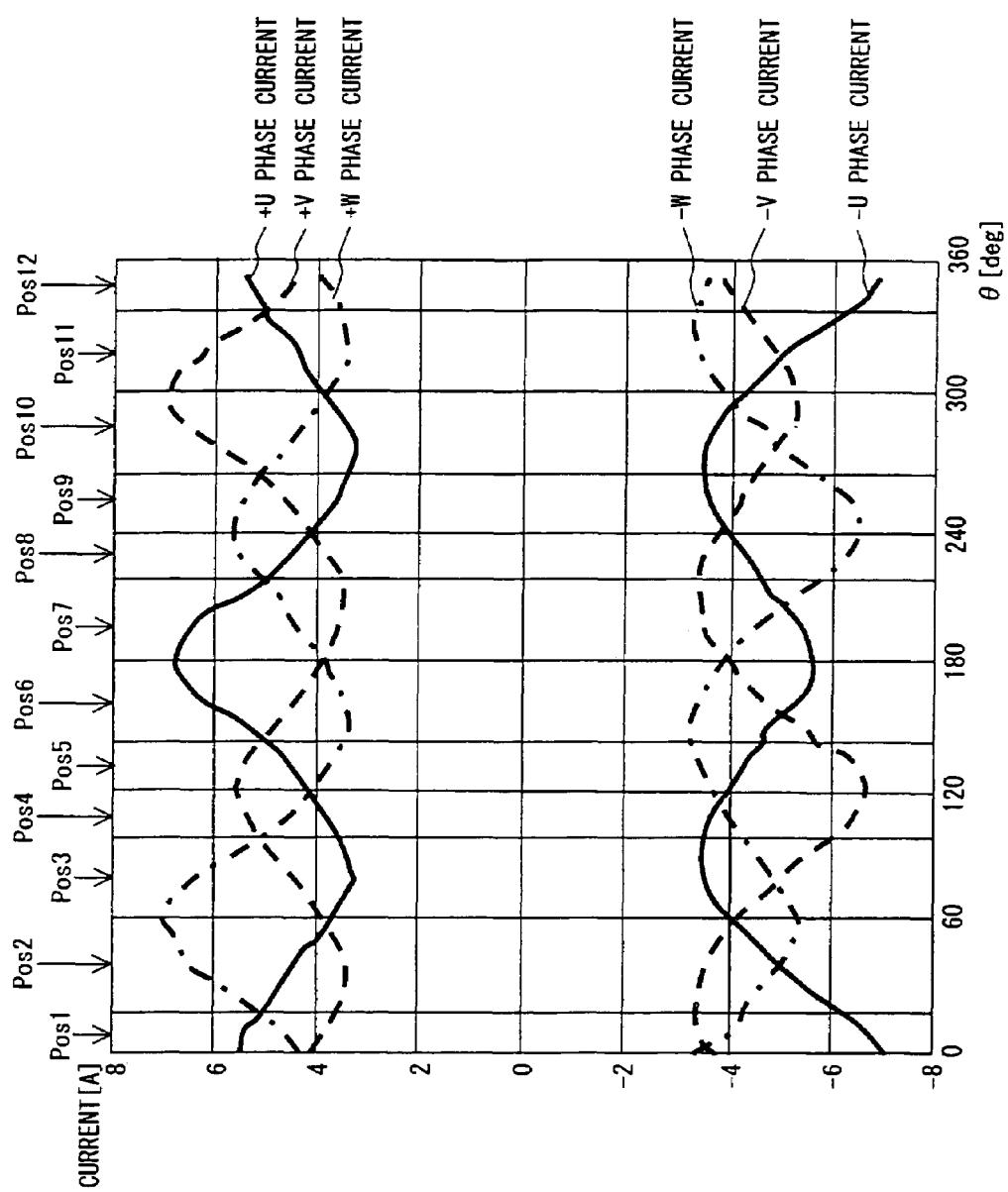
FIG. 3 shows an example of a current data table as a graph.

FIG. 3 shows an example of the "current data table" as a graph. A vertical axis in the graph of FIG. 3 represents currents [A], and a horizontal axis represents initial positions θ [deg] of the rotor 83 of the three-phase motor 82 (for example, rotation angles 0 to 360 [deg] of the rotor 83 with respect to a coil that constitutes the U phase in the three-phase motor 82 shown in FIG. 2 as a reference). Additionally, on a portion higher than a line of zero [A] of the graph of FIG. 3, a solid line denotes a U phase current when voltages are applied from the U phase to the V and W phases (hereinafter referred to as +U phase current), a dashed line denotes a V phase current when voltages are applied from the V phase to the U and W phases (hereinafter referred to as +V phase current), and a dot/dash line denotes a W phase current when voltages are applied from the W phase to the U and V phases (hereinafter referred to as +W phase current). Also on a portion lower than a line of zero [A] of the graph of FIG. 3, a solid line denotes a U phase current when voltages are applied from the V phase and W phase to the U phase (hereinafter referred to as −U phase current), a dashed line denotes a V phase current when voltages are applied from the U phase and the W phase to the V phase (hereinafter referred to as −V phase current), and a dot/dash line denotes a W phase current when voltages are applied from the U phase and the V phase to the W phase (hereinafter referred to as −W phase current).

The "current data table" recorded in the control device 10 is divided into a plurality of areas in advance by dividing the area ranging from 0 degree to 360 degrees as the rotation angle of the rotor 83 for each given range.

In an example of the graph in FIG. 3, the area of the rotation angle is divided into twelve areas (Pos 1 to Pos 12) in which initial positions of the rotor 83 when any two of the solid line (+U phase current), the dashed line (+V phase current) and the dot/dash line (+W phase current) cross each other are used as boundaries. Additionally, a manner of dividing the area in the "current data table" or the number of the areas is not limited.

As above, the control device 10 obtains the initial position of the rotor 83 by using the "current data table" which specifies relationships between currents in the respective phases in the three-phase motor 82 and the rotation angles of the rotor 83, accordingly, the initial position of the rotor 83 can be obtained without a calculation. Thereby, the initial position of the rotor 83 can be obtained with high accuracy because the noise components are not amplified by calculations.

Next, operations of the control device 10 will be explained.

Figure 4:
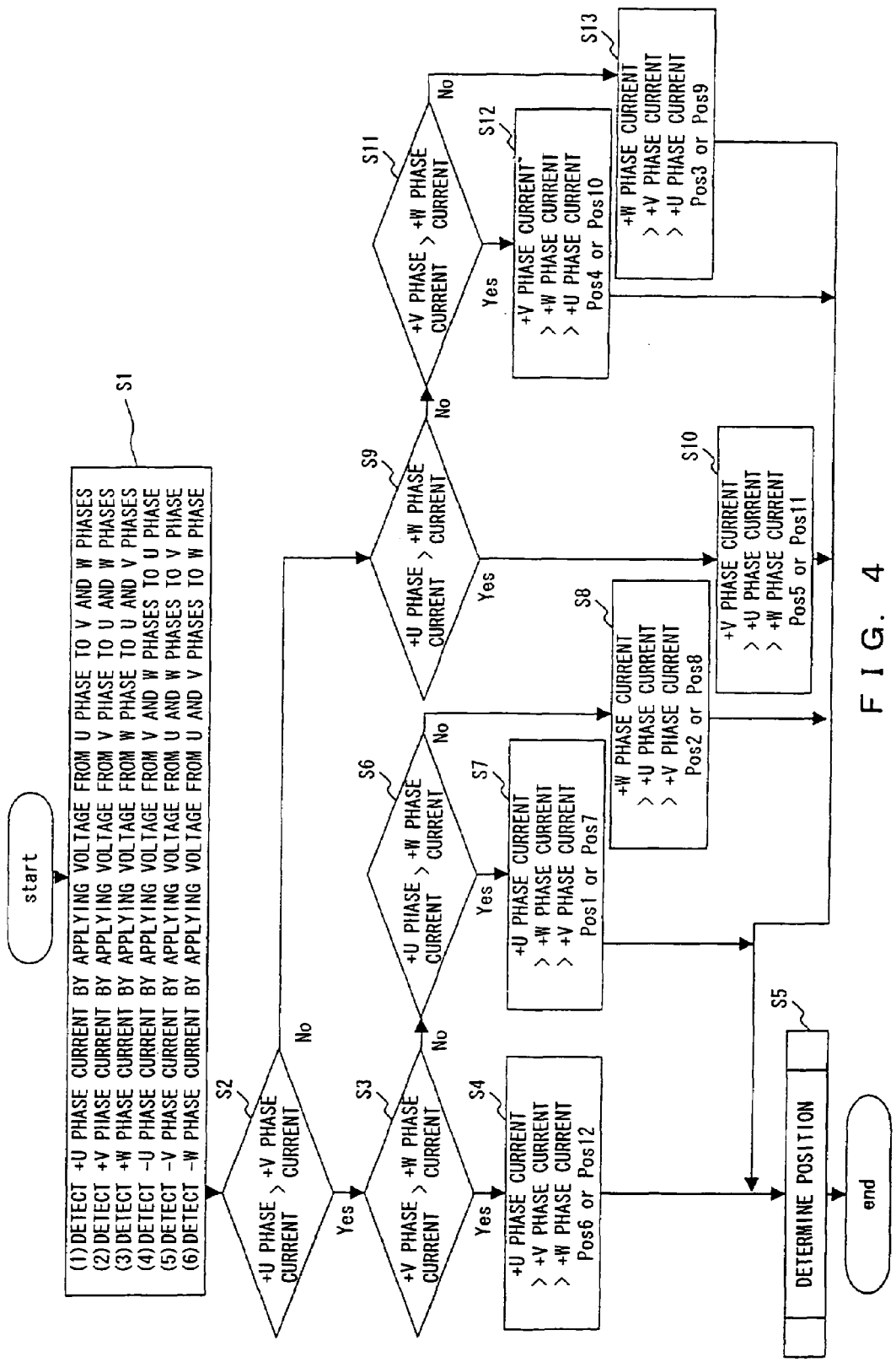
FIG. 4 is a flowchart that explains operations of a control device in an embodiment of the present invention.

FIG. 4 is a flowchart that explains operations of the control device 10.

First, in a step S1, before driving the three-phase motor 82, the control device 10 obtains the +U phase current by applying a voltage from the U phase to the V and W phases, obtains the +V phase current by applying a voltage from the V phase to the U and W phases, obtains the +W phase current by applying a voltage from the W phase to the U and V phases, obtains the −U phase current by applying a voltage from the V and W phases to the U phase, obtains the −V phase current by applying a voltage from the U and W phases to the V phase, and obtains the −W phase current by applying a voltage from the U and V phases to the W phase.

Figure 5A:
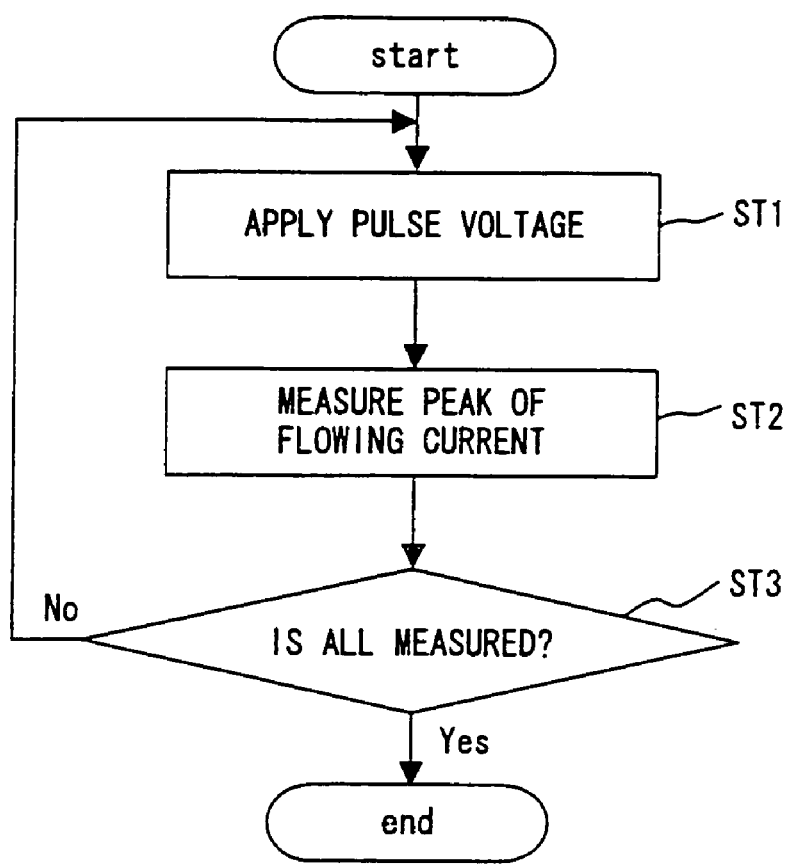
FIG. 5A is a flowchart which explains operations in a step S1.

FIG. 5A is a flowchart which explains operations in the step S1.

First, in a step ST1, the control device 10 applies voltages to the respective phases in the three-phase motor 82 for an arbitrary period of time (this period of time can be varied by adjusting pulse width of the applied voltage, and is set such that sufficient currents flow in the respective phases in order to suppress influences by the noise components).

Next, in a step ST2, the control device 10 measures peaks of currents that have flowed in the respective phases.

Figure 5B:
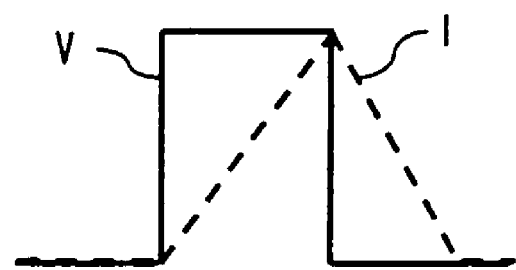
FIG. 5B shows a relationship between a voltage applied to one of respective phases in a three-phase motor and a current flowing in the above one phase.

FIG. 5B shows a relationship between a voltage applied to one of the respective phases in the three-phase motor 82 and the current flowing in the above one phase. In FIG. 5B, a vertical axis represents a magnitude of a voltage or a current, and a horizontal axis represents time. Also, in FIG. 5B, a solid line denotes a pulse voltage applied to one phase, and a dashed line denotes a current flowing in the above one phase.

As shown in FIG. 5B, a peak of a current can be measured by measuring a current at the time of rising of the pulse voltage.

A variation amount Δi of a current in each phase when a voltage is applied to each phase in the three-phase motor 82 can be obtained by an equation (1) of Δi=V (voltage)/L (Inductance)×Δt (change amount of time). The currents in the respective phases can be obtained by using the above equation (1).

Then, in a step ST3 in FIG. 5A, the control device 10 determines whether or not currents in plus and minus directions in all the phases have been obtained, and when it is determined that the currents in the plus and minus directions in all the phases have been obtained, (Yes in the step ST3), the process is ended. When it is determined that the currents in the plus and minus directions in all the phases have not been obtained, (No in the step ST3), the process returns to the step ST1.

Next, in a step S2 in FIG. 4, the control device 10 determines whether or not +U phase current is higher than the +V phase current.

Then, when it is determined that the +U phase current is higher than the +V phase current (Yes in the step S2), the control device 10 determines whether or not the +V phase current is higher than the +W phase current in a step S3.

When it is determined that the +V phase current is higher than the +W phase current (Yes in the step S3), the control device 10 determines, in a step S4, that relationships among the +U phase current, the +V phase current and the +W phase current detected in the step S1 satisfy an inequality of +U phase current>+V phase current>+W phase current. And the control device 10 determines that the initial position of the rotor 83 is in a range of a rotation angle specified by one of two areas Pos 6 and Pos 12 in the graph of FIG. 3.

Then, in a step S5, the control device 10 obtains an area corresponding to the current detected in the step S1 among the above determined areas, and obtains the initial position of the rotor 83 in the determined area.

When it is determined that the +V phase current is not higher than the +W phase current (No in the step S3), the control device 10 determines whether or not the +U phase current is higher than the +W phase current in a step S6.

Then, when it is determined that the +U phase current is higher than the +W phase current (Yes in a step S6), the control device 10 determines, in a step S7, that relationships among the +U phase current, the +V phase current and the +W phase current detected in the step S1 satisfy an inequality of +U phase current>+W phase current>+V phase current. And the control device 10 determines that the initial position of the rotor 83 is in a range of a rotation angle specified by one of two areas Pos 1 and Pos 7 in the graph of FIG. 3. Thereafter, the process proceeds to a step S5.

To the contrary, when it is determined that the +U phase current is not higher than the +W phase current (No in a step S6), the control device 10 determines, in a step S8, that relationships among the +U phase current, the +V phase current and the +W phase current detected in the step S1 satisfy an inequality of +W phase current>+U phase current>+V phase current. And the control device 10 determines that the initial position of the rotor 83 is in a range of a rotation angle specified by one of two areas Pos 2 and Pos 8 in the graph of FIG. 3. Thereafter, the process proceeds to a step S5.

Also, when it is determined that the +U phase current is not higher than the +V phase current (No in the step S2), the control device 10 determines whether or not the +U phase current is higher than the +W phase current in a step 9.

When it is determined that the +U phase current is higher than the +W phase current (Yes in a step S9), the control device 10 determines, in a step S10, that relationships among the +V phase current, the +U phase current and the +W phase current detected in the step S1 satisfy an inequality of +V phase current>+U phase current>+W phase current. And the control device 10 determines that the initial position of the rotor 83 is in a range of a rotation angle specified by one of two areas Pos 5 and Pos 11 in the graph of FIG. 3. Thereafter, the process proceeds to a step S5.

Meanwhile, when it is determined that the +U phase current is not higher than the +W phase current (No in the step S9), the control device 10 determines whether or not the +V phase current is higher than the +W phase current in a step S11.

When it is determined that the +V phase current is higher than the +W phase current (Yes in a step S11), the control device 10 determines, in a step S12, that relationships among the +V phase current, the +U phase current and the +W phase current detected in the step S1 satisfy an inequality of +V phase current>+W phase current>+U phase current. And the control device 10 determines that the initial position of the rotor 83 is in a range of a rotation angle specified by one of two areas Pos 4 and Pos 10 in the graph of FIG. 3. Thereafter, the process proceeds to a step S5.

Meanwhile, when it is determined that the +V phase current is not higher than the +W phase current (No in a step S11), the control device 10 determines, in a step S13, that relationships among the +V phase current, the +U phase current and the +W phase current detected in the step SI satisfy an inequality of +W phase current>+V phase current>+U phase current. And the control device 10 determines that the initial position of the rotor 83 is in a range of a rotation angle specified by one of two areas Pos 3 and Pos 9 in the graph of FIG. 3. Thereafter, the process proceeds to a step S5.

Next, the step S5 in FIG. 4 will be explained.

Figure 6:
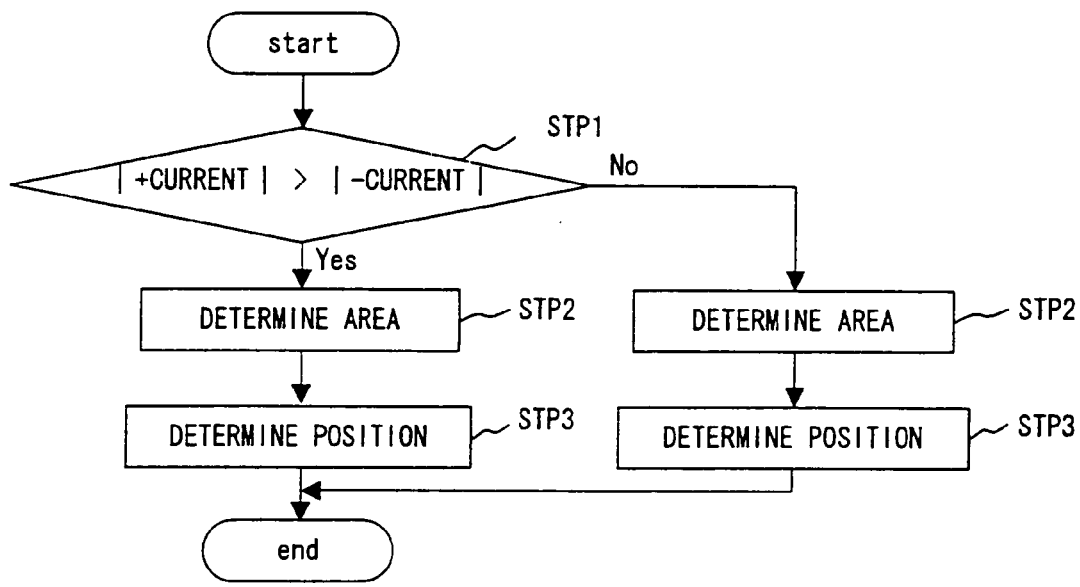
FIG. 6 is a flowchart for explaining operation in a control device according to an embodiment of the present invention.

FIG. 6 is a flowchart for explaining operation in the step S5.

First, in a step STP1, the control device 10 determines whether or not an absolute value of a positive current which is determined to be the highest in the steps S4, S7, S8, S10, S12 or S13 in FIG. 4 is higher than an absolute value of a negative current that corresponds to the above positive current.

Next, in a step STP2, the control device 10 determines one of the two areas which were determined in the steps S4, S7, S8, S10, S12 or the S13 in FIG. 4 based on a determination result in the step STP1.

As above, the rotation angle of the rotor 83 can be obtained based on the relationships among the currents in the respective phases, therefore, the initial position of the rotor 83 can be generally obtained without a calculation.

Then, in a step STP3, the control device 10 determines a phase in which a current with the largest slope in the determined area, and sets, as the initial position of the rotor 83, a value which can be obtained by substituting a current detected by the current sensors 8 and 9 into a linear equation with the above largest slope.

Then, when the initial position of the rotor 83 is obtained in the step STP3, the control device 10 flows direct currents based on the obtained initial position of the rotor 83 in the respective phases, and fixes the initial position of the rotor 83.

Thereby, the three-phase motor 82 can be started with zero errors regarding the initial position of the rotor 83. Accordingly, torque can be produced more effectively upon starting the three-phase motor 82.

Additionally, it is also possible that the control device 10 records, in advance, a "slope data table" that specifies relationships between a given area among twelve areas and a phase of a current with the largest slope in that area, and a phase corresponding to the area determined in the step STP2 is acquired from the "slope data table" in order to process the step STP3.

Also, it is also possible that the control device 10 records, in advance, a "linear equation data table" which specifies relationships between a given area among the twelve areas and a linear equation, and a linear equation corresponding to the phase determined in the step STP3 is acquired from the "linear equation data table" in order to process the step STP3.

As above, the rotation angle of the rotor 83 is obtained by substituting the detected current into a linear equation with the largest slope, accordingly, the initial position of the rotor 83 can be obtained with respect to a phase of a current with a high current variation rate, in other words, with respect to a phase of a current with less error. Further, the initial position of the rotor 83 can be obtained with higher accuracy.

The respective flowcharts in FIG. 4, FIG. 5A and FIG. 6 can be realized by a program corresponding to the flowcharts, which is recorded in a RAM (Random Access Memory), a ROM (Read Only Memory) or the like in advance, read out of the ROM, the RAM or the like, and executed by a CPU or the like.

Next, operations in the step S5 when for example it is determined that the inequality of +U phase current>+V phase current>+W phase current is satisfied in the step S4 in FIG. 4 will be explained.

Figure 7A:
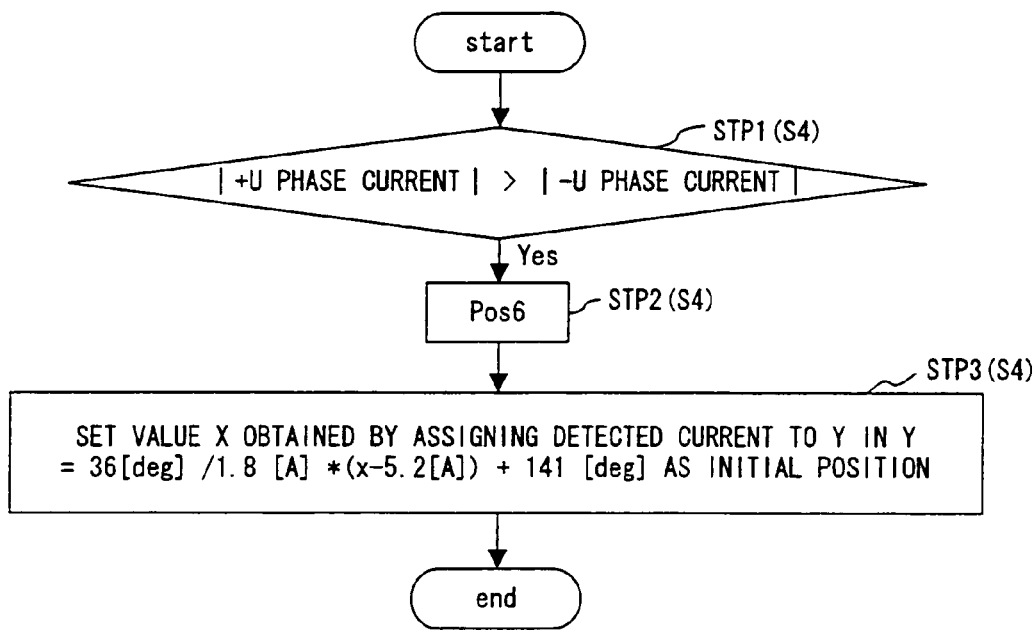
FIG. 7A is a flowchart for the step S5 to be executed when it is determined that +U phase current>+V phase current>+W phase current is satisfied.
Figure 7B:
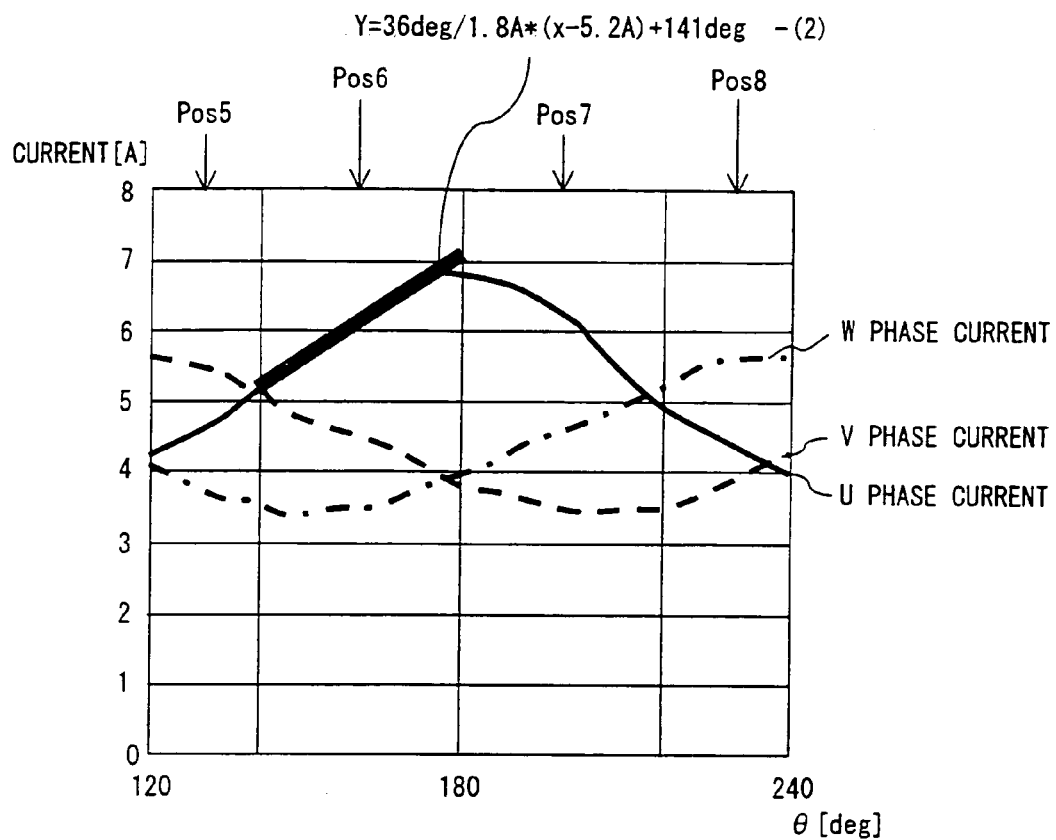
FIG. 7B shows a linear equation when a current which is determined to have the largest slope in the flowchart in FIG. 7A is approximated to a linear line.

FIG. 7A is a flowchart for the step S5 to be executed when it is determined that +U phase current>+V phase current>+W phase current is satisfied. FIG. 7B shows a linear equation when a current which is determined to have the largest slope in the flowchart in FIG. 7A is approximated to a linear line.

First, in the step STP 1 (S4), the control device 10 determines whether or not an absolute value of the +U phase current is higher than that of the −U phase current in the Pos 6 or the Pos 12. Specifically, the control device 10 selects the Pos 6 when the absolute value of the +U phase current in the Pos 6 is higher than that of the -U phase current in the Pos 6, and selects the Pos 12 when the absolute value of the +U phase current in the Pos 12 is higher than that of the −U phase current in the Pos 12.

In an example of the "current data table" shown in FIG. 3, the absolute value of the +U phase current in the Pos 6 is higher than that of the −U phase current in the pos 6, and the absolute value of the +U phase current in the Pos 12 is lower that that of the −U phase current in the Pos 12, therefore, the control device 10 selects the Pos 6 in the step STP2 (S4).

Then, in the step STP3 (S4), the control device 10 selects the +U phase current as a current with the largest slope in the Pos 6, assigns the current in the U phase detected by the current sensor 8 to Y in a linear equation (2) when the +U phase current in the Pos 6 is approximated to a linear line i.e., Y=36 [deg]/1.8 [A]×(x−5.2 [A])+141 [deg] (see FIG. 7B), and sets obtained value x as the initial value of the rotor 83. For example, the initial position of the rotor 83 is generally determined to be in the Pos 6, the initial position x of the rotor 83 is 146.5 [deg] when the detected current in the U phase is 6 [A].

As the above embodiment, the rotation angle of the rotor 83 is obtained by dividing the "current data table" into a plurality of areas and substituting a detected current into a linear equation corresponding to the current in the selected area, accordingly, the initial position of the rotor 83 can be obtained without a calculation.

Also, as the above embodiment, the initial position of the rotor 83 is obtained by using a data table, therefore, a cheap micro computer can constitute the control device 10 compared to the case where a calculation is required for obtaining the initial position of the rotor 83. Accordingly, cost for the inverter device 1 can be reduced.

Also, the initial position of the rotor 83 can be obtained based on a variation of inductance of coils which constitute the three-phase motor 82.

FIG. 8 shows an example of an "inductance data table" (a map of inductance distribution in accordance with changes of the rotation angle of the rotor 83) as a graph. In FIG. 8, a vertical axis represents inductance L of a coil constituting the U phase in the three-phase motor 82, and a horizontal axis represents a rotation angle θ [deg] of the rotor 83 in the three-phase motor 82. Also, in a graph in FIG. 8, a solid line denotes a variation of the inductance L in accordance with the rotation angle of the rotor 83, and a dashed line denotes a variation of the inductance L in accordance with the rotation angle of the rotor 83 with a magnetic pole opposite from that denoted by the solid line, and a data table corresponding to each line is recorded in a control device 2.

It is also possible that the control device 10 records, in advance, the "inductance data table" which specifies relationships between inductance and the rotation angles of the rotor 83 as shown in FIG. 8, obtains, from the "inductance data table" (the "inductance data table" corresponding to the magnetic pole of the three-phase motor 82 when the initial position of the rot(r 83 is acquired from the "current data table"), the rotation angle of the rotor 83 corresponding to the inductance based on a current detected by the current sensors 8 and 9, and adjusts the initial position of the rotor 83 acquired from the "current data table" by using the acquired rotation angle of the rotor 83. Additionally, two rotation angles different from each other by 180 degrees are acquired from the "inductance data table" based on the currents detected by the current sensor 8 and 9, and the rotation angle which is closer to the initial position of the rotor 83 acquired from the "current data table" is employed as the rotation angle, among the above two rotation angles.

It is possible that, for example, a mean value between the initial position of the rotor 83 obtained from the "current data table" and the rotation angle of the rotor 83 acquired from the "inductance data table" is employed as a definitive initial position of the rotor 83.

By using the "inductance data table" as above, the initial position of the rotor 83 can be obtained by taking influence of a variation of inductance in accordance with a rotation angle of the rotor 83 into account, accordingly, the initial position of the rotor 83 can be obtained more accurately.

In addition, in the above embodiment, a configuration is employed in which the three-phase motor 82 is driven or stopped. However, a configuration is also possible in which a two-phase motor or a motor with four or more phases is driven or stopped.

Further, in the above embodiment, a configuration is employed in which direct-current power is supplied to the inverter device 1 from the direct current source 81. However, a configuration is also possible in which direct-current power is supplied to the inverter device 1 from a direct current source which converts alternating-current power into direct-current power.

What is claimed is:
1. An inverter device, comprising:
   a plurality of switching elements which are provided in respective phases in a motor and which convert direct-current power into alternating-current power by being tuned on and off for driving the motor;
   a detecting unit for detecting a current in each phase in the motor;
   a control unit for controlling turning on and turning off of each of the plurality of switching elements, wherein:

the control unit records, in advance, a current data table which specifies relationships between currents in the respective phases in the motor and positions of a rotor of the motor, and obtains, from the current data table, an initial position of the rotor corresponding to a current detected by the detecting unit before driving of the motor;

the position of the rotor is a rotation angle of the rotor when one phase among the respective phases in the motor is a reference;

the current data table is divided into a plurality of areas with respect to the rotation angle of the rotor in advance; and the control unit finds a current data table which corresponds to a relationship among the currents in the respective phases detected by the detecting unit, among the plurality of current data tables, and sets, as the initial position of the rotor, a value which can be obtained by substituting a current detected by the detecting unit into a linear equation with a slope corresponding to an increase or a decrease of a current specified by the found current data table.

2. The inverter device according to claim 1, wherein:

the control unit obtains, from the current data table, the initial position of the rotor based on relationships among the currents in the respective phases detected by the detecting unit.

3. The inverter device according to claim 1, wherein:

the linear equation is a linear equation which corresponds to a current with a largest slope among currents in the respective phases in the motor in the found current data table.

4. The inverter device according to claim 1, wherein:

the control unit records, in advance, an inductance data table which specifies relationships between inductances in coils constituting the motor and positions of the rotor of the motor, obtains, from the inductance data table, the position of the rotor corresponding to inductance based on a current detected by the detecting unit, and adjusts the initial position of the rotor based on the obtained position of the rotor.

5. A control device which is provided in an inverter device including a plurality of switching elements provided in respective phases in a motor and converting direct-current power into alternating-current power by being tuned on and off for driving the motor and a detecting unit for detecting a current in each phase in the motor, and which controls turning on and turning off of each of the plurality of switching elements, wherein:

the control device records, in advance, a current data table which specifies relationships between currents in the respective phases in the motor and positions of a rotor of the motor, and obtains, from the current data table, an initial position of the rotor corresponding to a current detected by the detecting unit before driving of the motor;

the position of the rotor is a rotation angle of the rotor when one phase among the respective phases in the motor is a reference;

the current data table is divided into a plurality of areas with respect to the rotation angle of the rotor in advance; and the control device finds a current data table which corresponds to a relationship among the currents in the respective phases detected by the detecting unit, among the plurality of current data tables, and sets, as the initial position of the rotor, a value which can be obtained by substituting a current detected by the detecting unit into a linear equation with a slope corresponding to an increase or a decrease of a current specified by the found current data table.

6. The control device according to claim 5, wherein:

the control device obtains, from the current data table, the initial position of the rotor based on relationships among the currents in the respective phases detected by the detecting unit.

7. The control device according to claim 5, wherein:

the linear equation is a linear equation which corresponds to a current with a largest slope among currents in the respective phases in the motor in the found current data table.

8. The control device according to claim 5, wherein:

the control device records, in advance, an inductance data table which specifies relationships between inductances in coils constituting the motor and positions of the rotor of the motor, obtains, from the inductance data table, the position of the rotor corresponding to inductance based on a current detected by the detecting unit, and adjusts the initial position of the rotor based on the obtained position of the rotor.

* * * * *